(12) United States Patent
Tiziani et al.

(10) Patent No.: US 7,159,614 B2
(45) Date of Patent: Jan. 9, 2007

(54) ASSEMBLY FOR IN-LINE VALVE ACTUATION AND INDICATION

(75) Inventors: Peter C. Tiziani, Stafford Springs, CT (US); Ganesh Anatharaman, East Hartford, CT (US); Robert G. Pinter, Glastonbury, CT (US)

(73) Assignee: Hamilton Sundstrand, Windsor Locks, CT (US)

( * ) Notice: Subject to any disclaimer, the term of this patent is extended or adjusted under 35 U.S.C. 154(b) by 554 days.

(21) Appl. No.: 10/335,590

(22) Filed: Dec. 31, 2002

(65) Prior Publication Data

US 2004/0123908 A1   Jul. 1, 2004

(51) Int. Cl.
*F16K 37/00* (2006.01)
*F16K 31/44* (2006.01)

(52) U.S. Cl. .................. 137/556.6; 251/294; 74/89.2
(58) Field of Classification Search ............ 137/556.6; 251/294; 74/37, 89.2
See application file for complete search history.

(56) References Cited

U.S. PATENT DOCUMENTS

| 492,192 | A | * | 2/1893 | Creque | ...................... 251/294 |
|---|---|---|---|---|---|
| 867,605 | A | * | 10/1907 | Rothe | ......................... 251/294 |
| 1,246,848 | A | * | 11/1917 | Berry | .......................... 251/294 |
| 2,233,717 | A | * | 3/1941 | Shogran | ..................... 251/294 |
| 3,488,098 | A | * | 1/1970 | Sobczak | ..................... 74/89.2 |
| 3,521,499 | A | * | 7/1970 | Keith | ......................... 74/89.2 |
| 3,596,673 | A | * | 8/1971 | Laucournet | ................. 74/89.2 |
| 4,161,004 | A | * | 7/1979 | Dalziel | ....................... 74/89.2 |
| 4,353,262 | A | * | 10/1982 | Talbot | ........................ 74/89.2 |
| 4,442,046 | A | * | 4/1984 | Edmonston | ................. 74/89.2 |

* cited by examiner

*Primary Examiner*—John Rivell
(74) *Attorney, Agent, or Firm*—Carlson, Gaskey, & Olds (57) ABSTRACT

An improved assembly for use in an in-line starter valve. A flexible material system in the form of a flexible belt is used to translate motion from a manually operable wrench shaft to a piston rod in order to render an in-line starter valve to a closed, partially opened, or an extreme opened position. When the wrench shaft is manually rotated, tension is imparted on the flexible band which, in turn, translates tension to a piston rod which then travels longitudinally resulting in the opening or closing of the in-line starter valve. An index mark on a handle of the wrench shaft indicates the closed, partially opened, or extreme opened position of the in-line starter valve. The use of the flexible belt affords greater durability, less weight, and less costly production than the prior art assemblies.

18 Claims, 8 Drawing Sheets

ASSEMBLY FOR IN-LINE VALVE ACTUATION AND INDICATION

BACKGROUND OF THE INVENTION

The present invention relates to an assembly for the actuation of an in-line valve, and preferably a starter valve, and the indication for its opened or closed status.

In gas turbine engines, such as is used in airplane engines, high-pressure air is delivered to an air driven engine starter motor. In some of these engines, this air flow is controlled by an in-line starter valve. The starter valve operates in a high temperature environment that is high (in some cases on the order of 400 to 450 degrees Fahrenheit) due to its proximity to the engine and the temperature of the high-pressure air that it controls. Typically, the valve is pneumatically activated by pressure exerted from a pneumatic chamber, but an external wrenching mechanism is provided to permit manual actuation. For purposes of this application, it should be understood that the "manual" application could be driven by a power tool or other device that does not impede valve motion during normal conditions. The wrenching mechanism also serves as the valve position indicator as the valve position may be determined by comparing the angular position of an index mark on the manual wrench shaft to "open" and "close" marks on the outside of the valve housing.

When the valve is pneumatically activated, the wrenching mechanism is free to turn in a back driven motion dictated by the motion of the valve piston. The wrenching mechanism is lightly loaded resisted only by the friction of the mechanism itself and the spring force built into the system. In the event that the valve is manually activated, the wrenching mechanism must be capable of exerting a strong pull (in some cases on the order of a 300 pound pull) on the valve piston in a worst case condition to overcome duct air pressure that tends to hold the valve closed.

Typically the wrenching mechanism includes a "rack and pinion" assembly. However, using these assemblies in this application is costly, and of a relatively heavy weight, subject to jamming, and not very durable. These assemblies typically require routine lubricating maintenance to reduce gear wear and further are subject to backlash, which necessitates the use of a torsion spring along the manually operated shaft.

It would be desirable to provide an in-line starter valve with a manually operable wrenching assembly that eliminates the potential for jamming and backlash and does not have gears that would require lubricating maintenance. It would further be desirable for the in-line starter valve to be equipped with an assembly that is less costly to produce and lighter in weight than the rack and pinion assembly while at the same time affords greater durability and is able to withstand elevated temperatures.

SUMMARY OF THE INVENTION

In the disclosed embodiment of this invention the rack and pinion assembly of an in-line starter valve is replaced with a flexible wrenching mechanism. In preferred embodiments, this mechanism includes a one-piece flexible belt that wraps around and is attached to the manually operable wrench shaft. The flexible belt is configured such that it has end portions attached to a piston rod. The in-line valve is manually actuated by manually rotating the wrench shaft, exerting tension on the flexible belt which, in turn, is transmitted to the piston rod and provides motive force for the valve piston.

When the valve is pneumatically actuated the directional motion of the valve piston causes the piston rod to directionally translate accordingly. This exerts tension on the flexible belt, which is then transmitted to the wrapped periphery of the manually operable wrench shaft, which, in turn, causes it to rotate. The angle of rotation of the wrench shaft provides an indication of the position of the valve at an extreme opened, partially opened, or closed position. Thus, the flexible belt mechanism of the present invention provides a simplified yet effective alternative system for actuating and indicating the status of an in-line starter valve compared to the currently utilized method, which employs a rack and pinion device.

These and other features of the present invention can be best understood from the following specification and drawings, the following of which is a brief description.

DETAILED DESCRIPTION OF THE DRAWINGS

Figure 1:
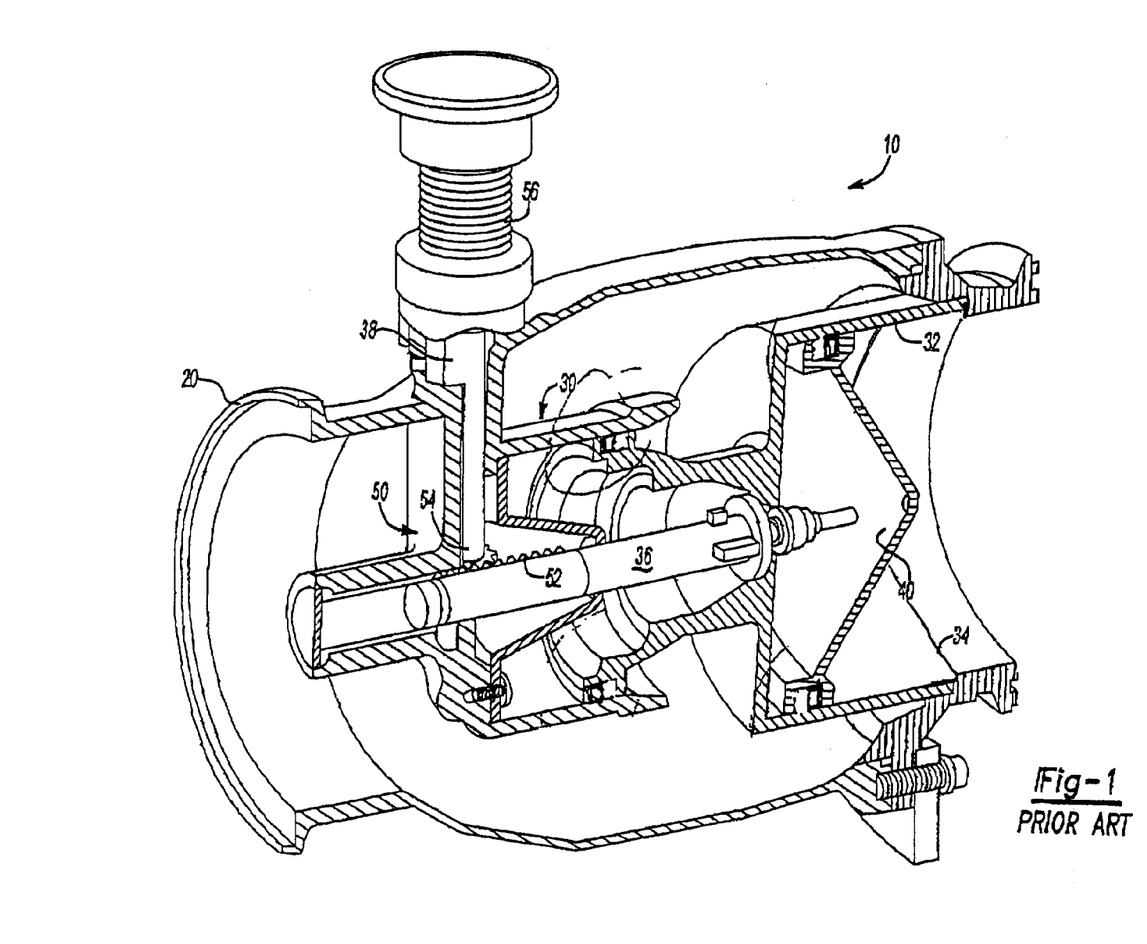
FIG. 1 is a schematic view of a simplified cross section of an in-line starter valve utilizing the manually operable wrenching mechanism of the prior art.

FIG. 1 schematically shows a cross section of a typical prior art in-line starter valve assembly at 10. As known, starter valve assembly 10 is generally comprised of valve housing 20, valve piston assembly 30, and pneumatic chamber 40. Valve piston assembly 30 includes valve piston 32 which may be received by valve piston seat 34. Valve piston 32 is securely coupled to piston rod 36 which is movably coupled to wrench shaft 38. Wrench shaft 38 is positioned at an angle of ninety degrees relative to piston rod 36 such that longitudinal actuation of piston rod 36 due to air pressure from pneumatic chamber 40 translates to wrench shaft 38 and causes wrench shaft 38 to rotate. Accordingly, manual actuation or rotation of wrench shaft 38 translates to piston rod 36 causing piston rod 36 to slide longitudinally thus rendering valve piston 32 into an opened or closed position relative to valve piston seat 34.

Piston rod 36 and wrench shaft 38 relate together by way of a movable coupling shown generally at 50. As can be seen in this prior art configuration, movable coupling 50 comprises a rack element 52 positioned along the surface of piston rod 36 which relates to pinion element 54 positioned on wrench shaft 38.

Typically, this rack and pinion mechanism requires the use of a torsion spring 56 that is necessary to control backlash. Further, the rack and pinion mechanism of the prior art is costly, subject to jamming and wear, and typically requires lubricating maintenance.

Figure 2:
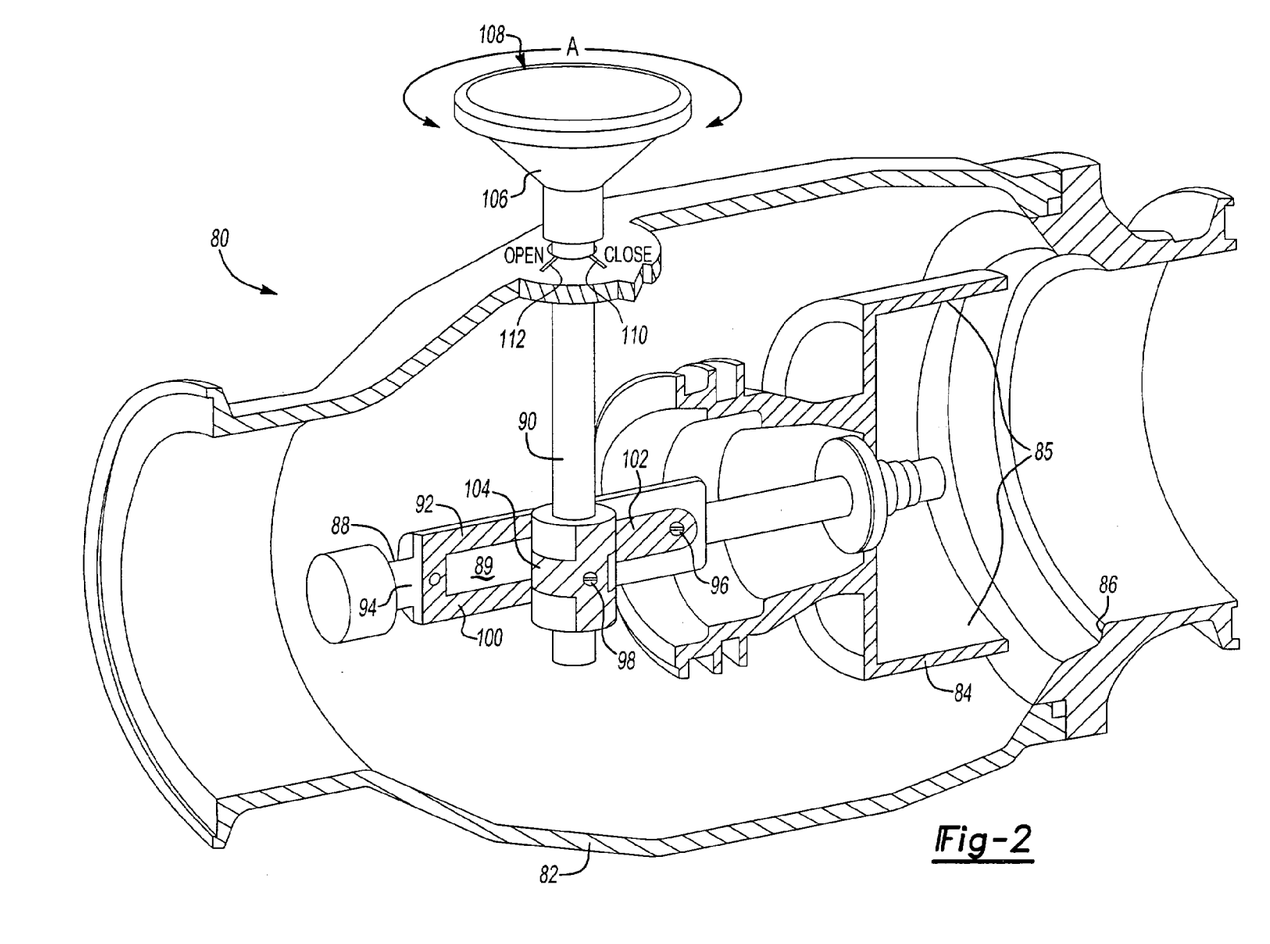
FIG. 2 is a schematic view of a simplified cross section of an in-line starter valve utilizing the flexible belt assembly of the present invention in a partially opened position.

FIG. 2 shows a simplified cross sectional view of the proposed in-line starter valve assembly of the present invention shown generally at 80. The valve housing is shown at 82. Valve piston 84 which may be received by valve piston seat 86 is securely coupled to piston rod 88. Alternatively, the valve piston 84 may include a flexible connection piston rod 88. A pneumatic chamber is generally indicated at 85. Piston rod 88 is movably coupled to wrench shaft 90 by way of the movable coupling of the present invention, here flexible belt 92. Flexible belt 92 is attached at a first end 94 and a second opposing end 96 to a flattened side 89 of piston rod 88. Flexible belt 92 also wraps around and is attached at a midpoint 98 to wrench shaft 90. While the illustration shows the flexible belt 92 attached to the wrench shaft 90 and piston rod 88 with screws, it is to be understood that any suitable means of attachment (welding, brazing, bonding, etc.) may be used.

As air pressure from pneumatic chamber 85 increases, valve piston 84 is driven in a direction away from valve piston seat 86 thus rendering the in-line starter valve 80 in a range of possible opened positions. Valve piston 84 as shown in FIG. 2 is in a partially opened position. As piston rod 88 is actuated, tension is transmitted to flexible belt 92 at segments that are held flat against the flattened side 89 of piston rod 88. Tension is further transmitted to flexible belt 92 at a segment that is curved around wrench shaft 90. As the in-line valve 80 is shown in a partially opened configuration in this figure, the flexible belt segments that are held flat are shown at 100 and 102 and the flexible belt segment that is curved about wrench shaft 90 is shown at 104. The portions of flexible belt 92 that constitute the flat or curved segments change, based upon the opened or closed position of the in-line starter valve 80 as will be evident from the subsequent drawings which show the starter valve in its extreme opened and closed positions.

With continued reference to FIG. 2, actuation of piston rod 88 may be manually controlled by the manual rotation of wrench shaft 90. The rotation of wrench shaft 90 imparts tension to the curved segment 104 of flexible belt 92 that is wrapped about wrench shaft 90. In turn, this tension is transmitted to the held flat segments 100, 102 of flexible belt 92 and thus to the piston rod 88 causing piston rod 88 and hence valve piston 84 to translate longitudinally thus rendering the in-line starter valve 80 to an opened or closed position.

Wrench shaft 90 may be provided with tool alignment feature 106 for manual rotation. What is shown is a funnel-like feature which guides a male tool into a female wrenching feature. The valve assembly includes a means to indicate an opened, partially opened, or closed status of the in-line starter valve 80 by way of a visual indication of the angle of rotation of wrench shaft 90 in the form of a variable index mark 108 that may be compared to a set of fixed index marks 110,112. The range of rotation is indicated by arrow A.

Figure 3:
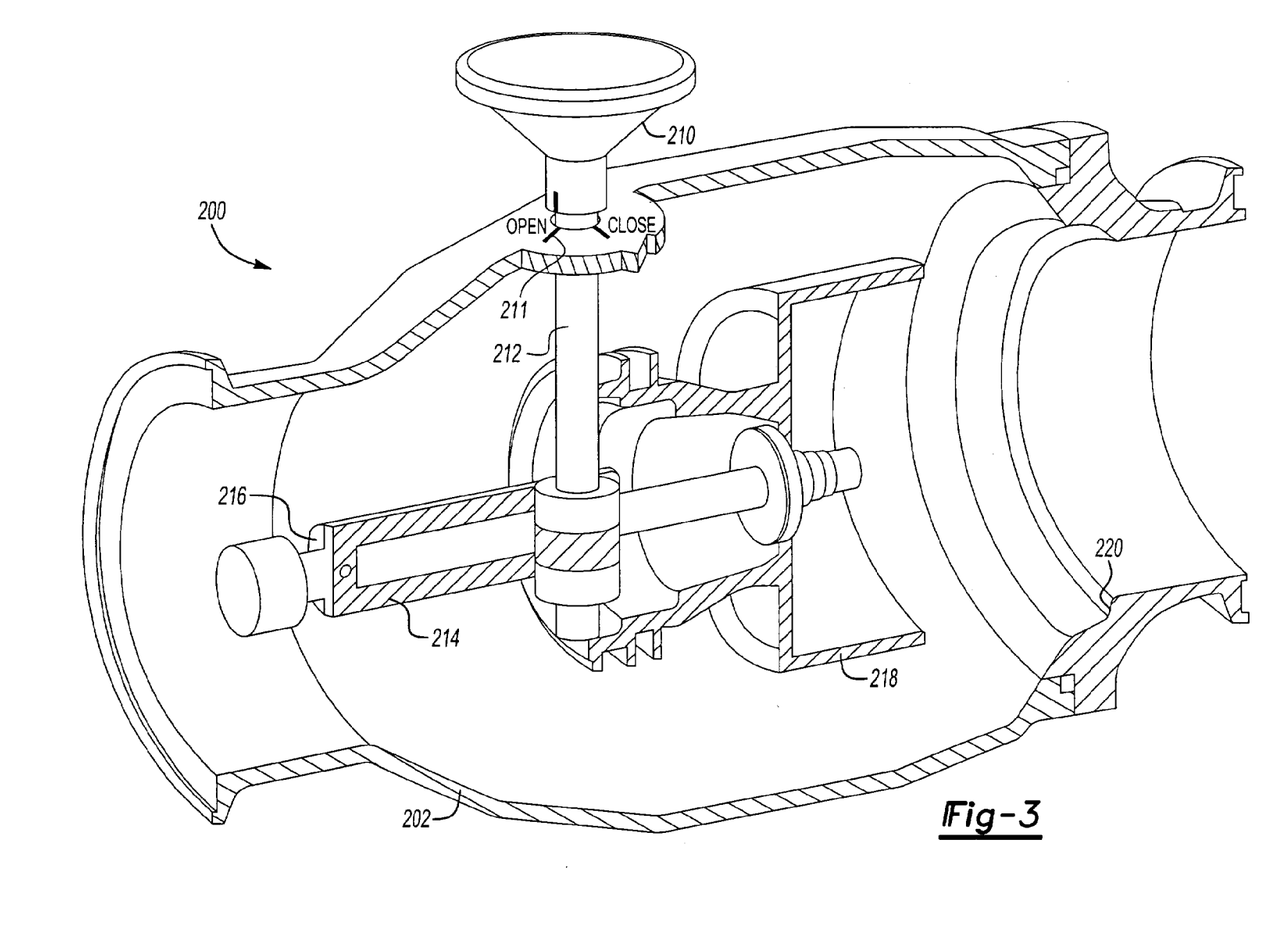
FIG. 3 is a schematic view of a simplified cross section of an in-line starter valve utilizing the flexible belt assembly of the present invention in an extreme opened position.

FIG. 3 shows a simplified cross sectional view of the in-line starter valve of the present invention shown generally at 200 and in an extreme opened position shown. Valve housing is indicated at 202. As indicated on tool alignment feature 210, wrench shaft 212 is rotated counter clockwise to an extreme opened position shown by index mark 211. The manual rotation of wrench shaft 212 in a counter clockwise direction imparts tension to flexible belt 214 which, in turn, translates to piston rod 216. Piston rod 216 and valve piston 218 which is securely coupled thereto are longitudinally driven farthermost away from valve seat 220. Thus, in-line starter valve 200 is rendered in an extreme opened position.

Figure 4:
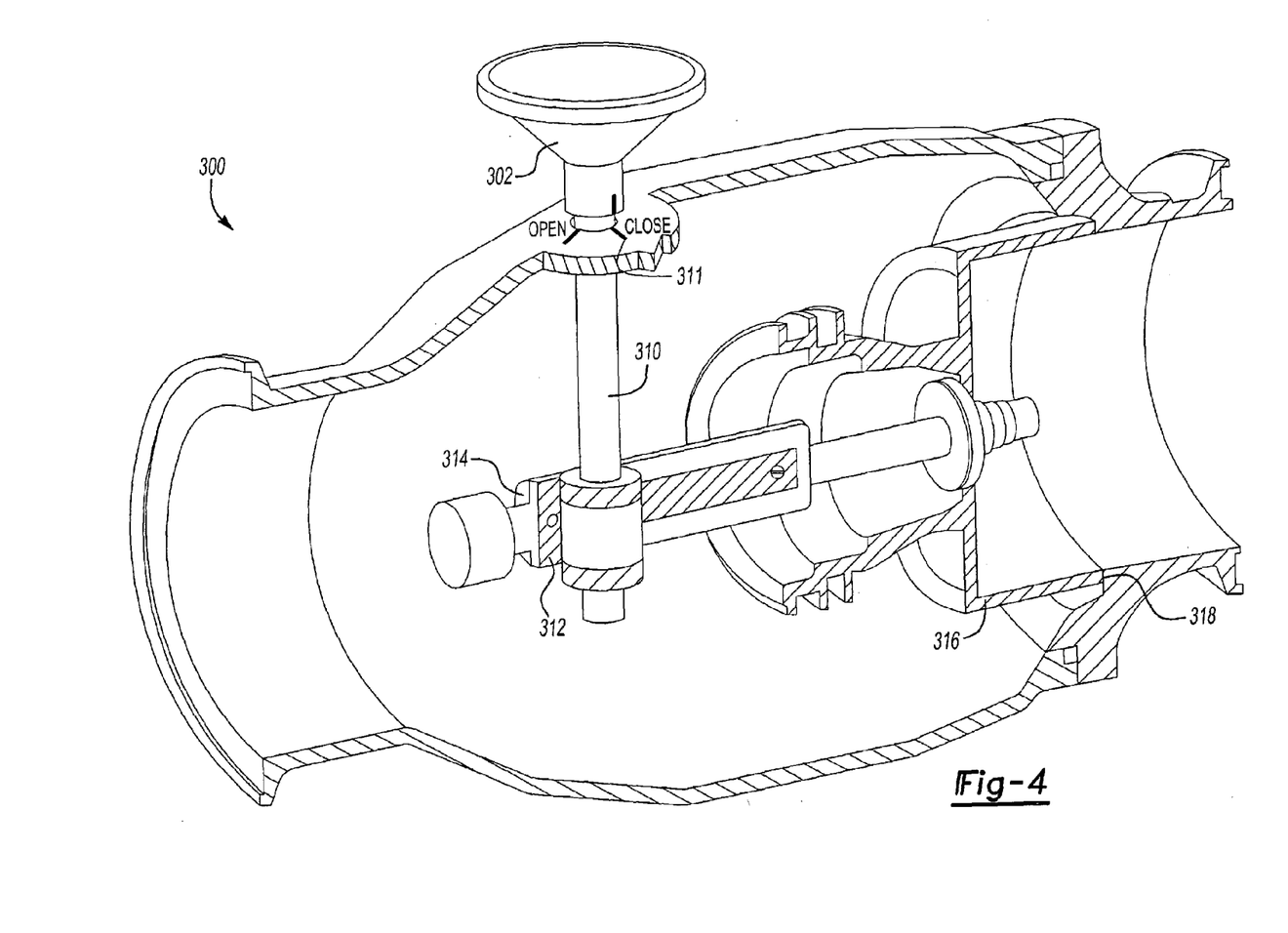
FIG. 4 is a schematic view of a simplified cross section of an in-line starter valve utilizing the flexible belt assembly of the present invention in a closed position.

With reference to FIG. 4, in-line starter valve 300 is shown in a closed position. As indicated on tool alignment feature 302, wrench shaft 310 is rotated clockwise to a position indicated as closed shown by index mark 311. The manual rotation of wrench shaft 310 in a clockwise direction imparts tension to flexible belt 312 that is opposite to the tension that is imparted when the wrench shaft is rotated in a counter clockwise direction. This tension is then translated to piston rod 314 and securely coupled valve piston 316 which are both driven longitudinally to rest on valve seat 318. The in-line starter valve 300 in this case is thus rendered to a closed position.

Figure 5A:
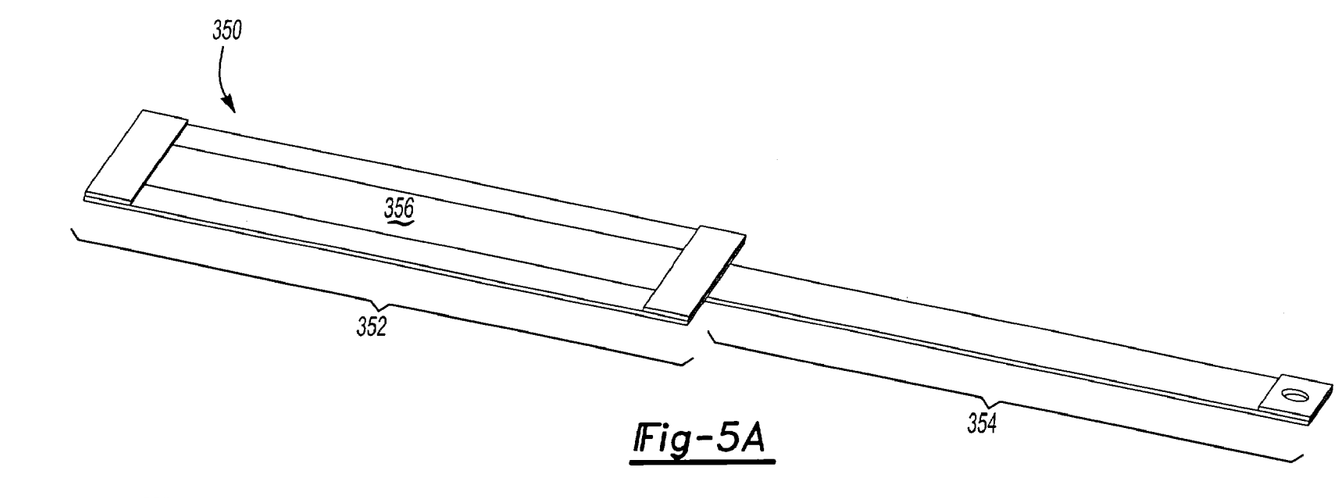
FIG. 5A is a schematic view of the flexible belt of the present invention in a laid flat configuration.
Figure 5B:
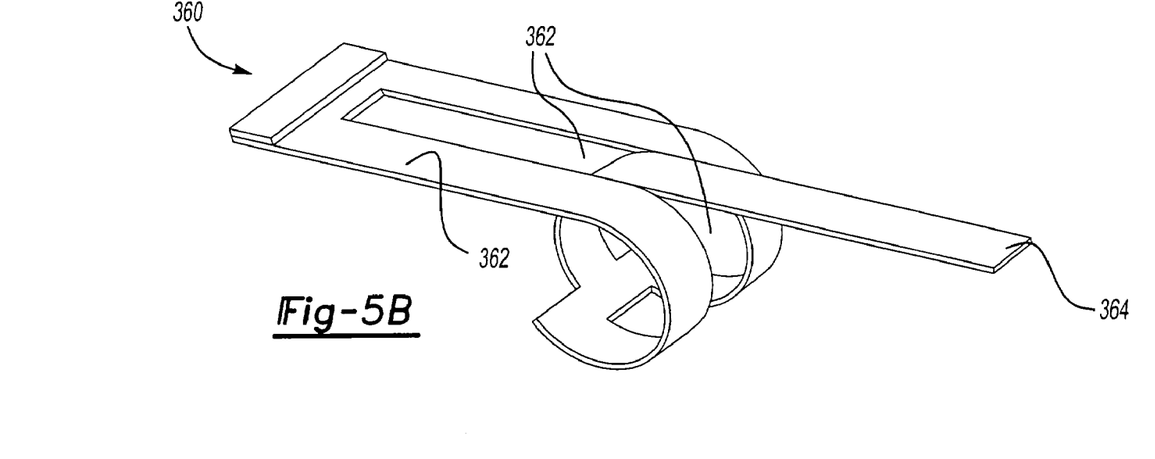
FIG. 5B is a schematic view of the flexible belt of the present invention in its installed configuration.

FIG. 5A schematically shows flexible belt 350 of the present invention in a laid flat configuration. In this laid flat configuration flexible belt 350 comprises a flexible frame portion 352 integrally connected to a flexible band segment 354. Flexible band segment 354 is of a width no greater than the width of the frame opening 356 within flexible frame portion 352 so that the flexible belt may be curved upon itself when in an installed configuration as shown in FIG. 5B at 360. In this installed configuration flexible belt 360 is curved upon itself such that flexible frame portion 362 receives flexible band segment 364 through frame opening 366. As can be appreciated, the segment 354 is spaced from the segment in the frame portion 352 such that the band can wrap upon itself. Stated another way, the portion of the frame portion 352 is spaced from the portion 354 along a direction of the axis of the wrench shaft 310.

It should be noted that the flexible belt of the present invention may be constructed using any flexible woven or non-woven, metallic or non-metallic material, depending upon the specific application. For instance, a non-metallic belt (i.e.: Nomex™, Kevlar™, etc.) might be preferred in the event that a tight bend radius is required, high temperatures are expected, or if the belt needs heavy damping properties.

Figure 6:
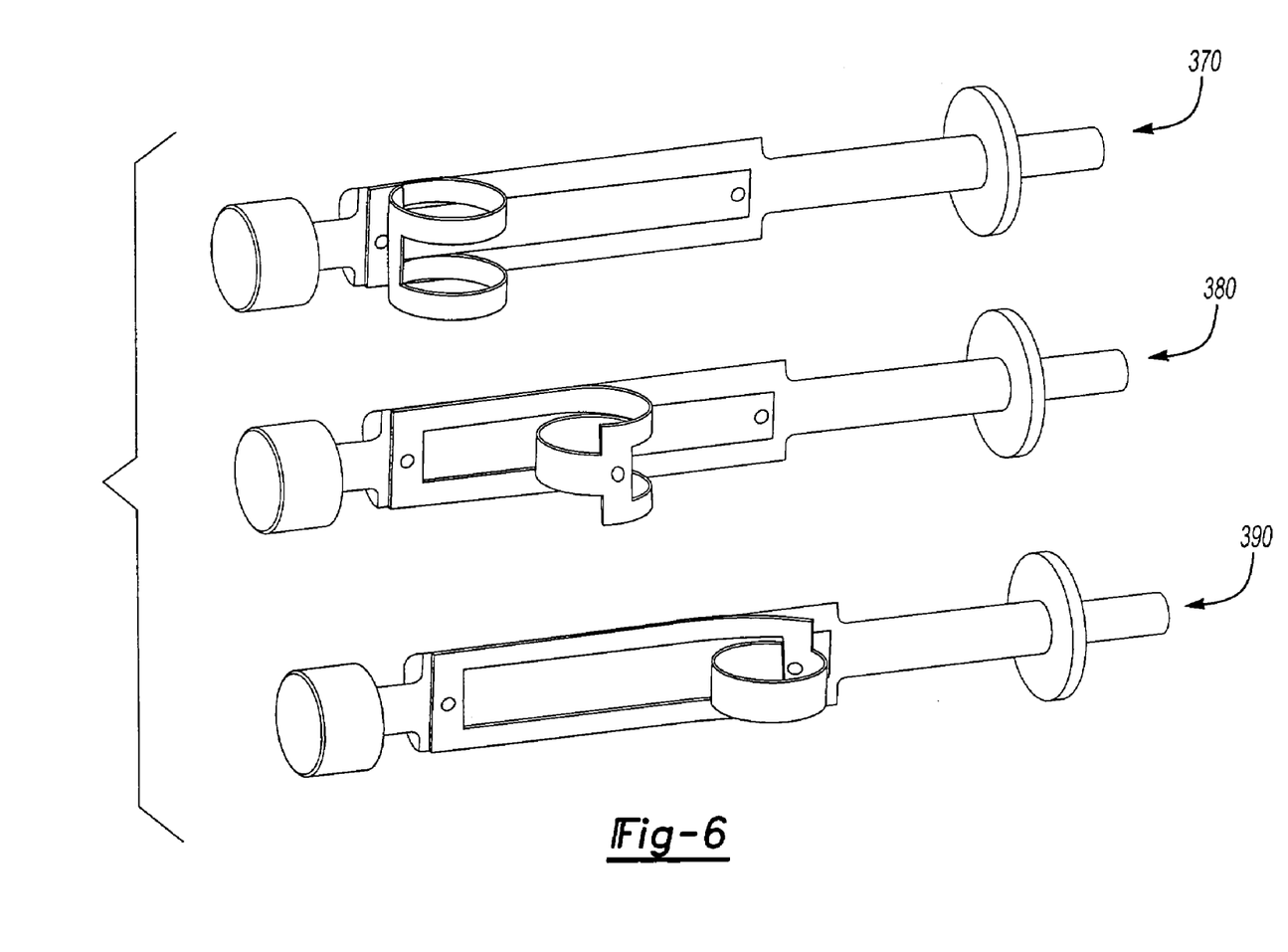
FIG. 6 is a comparative schematic view of the flexible belt of the present invention and attached piston rod through its range of travel.

FIG. 6 schematically demonstrates a comparative view of the flexible belt and attached piston rod through its range of motion from a closed valve position at 370 to a partially opened valve position at 380 to an extreme opened position at 390.

Figure 7:
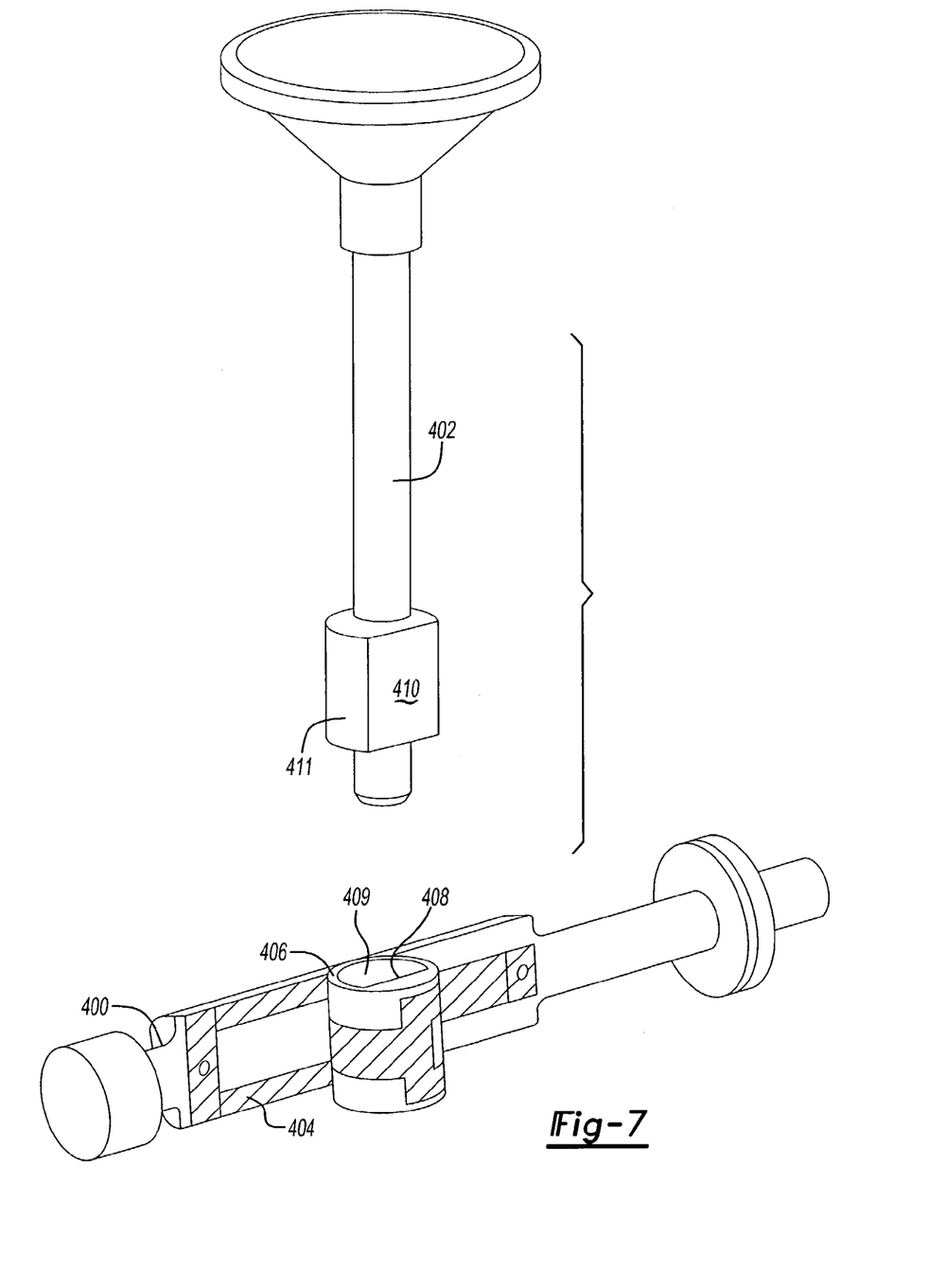
FIG. 7 is a schematic view of an alternative embodiment of the flexible belt assembly of the present invention.

FIG. 7 schematically depicts an alternative method of assembly of the movable coupling of a piston rod 400 to wrench shaft 402 using the flexible belt 404 of the present invention. In this assembly, flexible belt 404 is held securely to wrench shaft 402 by way of a bushing 406. Flexible belt 404 is secured to and wrapped about bushing 406. Bushing 406 is provided with a flattened surface 408 on a portion of its inner circumference 409 which corresponds to a second flattened surface 410 on the outer circumference 411 of that portion of wrench shaft 402 that is in contact with bushing 406. This provides a secure connection between wrench shaft 402 and bushing 406. The D-shape of bushing 406 may be replaced by other non-circular shapes. Using this configuration the flexible belt 404, piston rod 400 and bushing 406 may be provided as a pre-assembled unit. As such, there would be fewer small pieces (i.e., screws) that could work free and in addition, proper belt tension may be "built in" at the time of manufacture. Further, this configuration would allow drop-in assembly of the manually operable wrench shaft because the flattened surface portion on the inner circumference of the bushing would prevent slippage.

Figure 8:
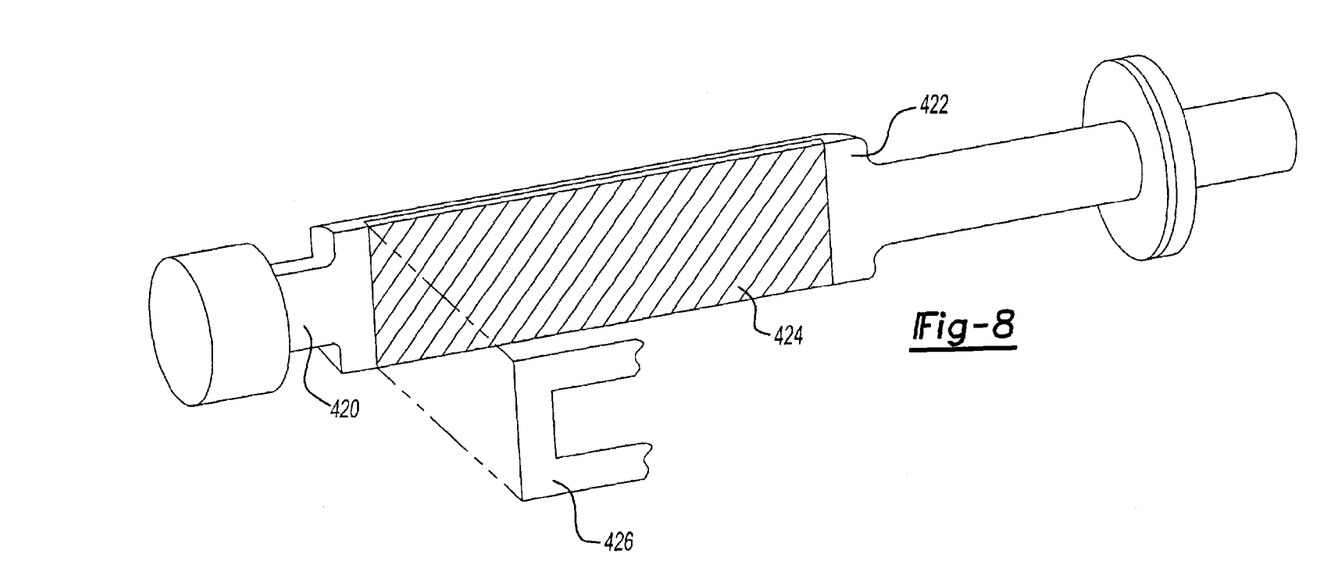
FIG. 8 is a schematic view of another embodiment of the flexible belt assembly of the present invention.

Due to its low mass, the flexible belt of the present invention is resistant to vibration. Further protection may be obtained however, by the addition of a damping material to the flexible belt or wrench shaft or piston rod. One means of doing this is demonstrated in FIG. 8. In this embodiment, an elastomer backing 424 is provided on the flattened side 422 of piston rod 420. Slight raising of the elastomer 424 would allow it to maintain intimate contact with the flexible belt 426.

Figure 9:
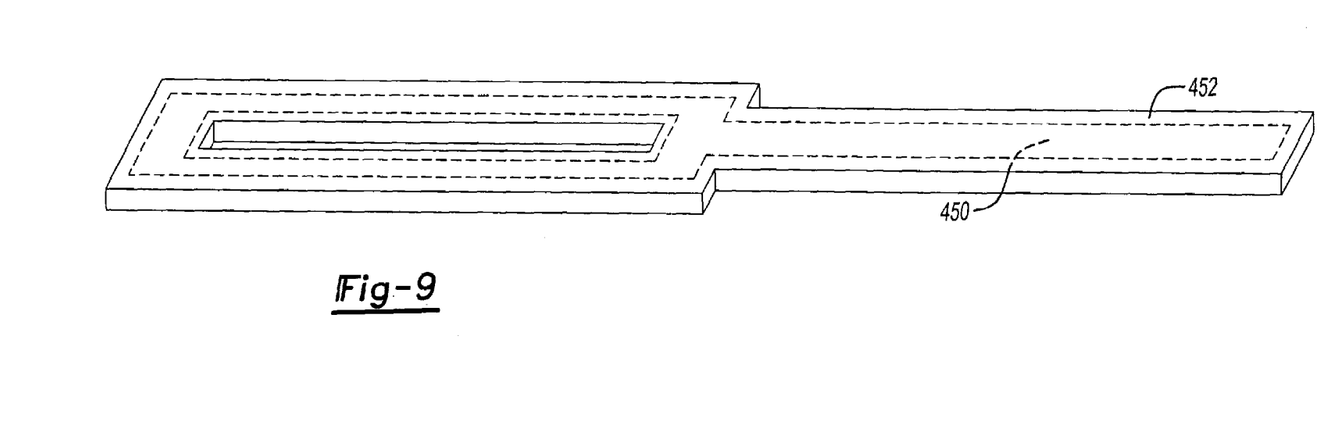
FIG. 9 is a schematic view of an alternative embodiment of the flexible belt of the present invention.

Alternatively, as shown in FIG. 9, flexible belt 450 may be coated with an elastomer 452 to achieve damping.

Although an elastomer, such as silicone rubber, is preferred, other deformable damping materials may be utilized. Other deformable damping materials might be used to accommodate environmental conditions which would be unsuitable.

It should be noted that while the flexible belt actuation and indication assembly has been described as it applies to a pneumatically driven valve, it is to be understood that the inventive assembly may also be successful as applied to a hydraulically driven valve, or other fluid driven valves (i.e., fuel drives).

It should further be understood that the basic concept of the inventive assembly may be executed with a flexible cable, cord or wire used in lieu of a flat belt. Giving these flexible materials multiple wraps around the manually operable wrench shaft would allow the 360 degree range of motion limitation inherent with the flat belt design to be exceeded.

While the specific application is shown in an in-line starter valve, it is within the scope of this invention that other in-line valves utilize the disclosed invention. Further, engines other than airplane engines can utilize this invention in in-line starter valves.

A preferred embodiment of this invention has been disclosed, however, a worker in this art would recognize that certain modifications would come within the scope of this invention. For that reason, the following claims should be studied to determine the true scope and content of this invention.

What is claimed is:

1. An in-line valve assembly comprising:
   a valve housing;
   a valve piston which may be received by a stationary valve piston seat, a piston rod coupled to said valve piston such that said piston rod and said valve piston are movable together relative to said stationary valve piston seat an air pressure chamber acting on said valve piston and operable to drive said piston rod and said valve piston;
   a manually operable wrench shaft coupled to said piston rod by way of a movable coupling such that when said manually operable wrench shaft is manually rotated, said piston rod and said valve piston are driven to travel together longitudinally; and
   when said piston rod and said valve piston are driven together longitudinally as a result of a pressure change in said air pressure chamber imparted to said valve piston, said manually operable wrench shaft is driven to rotate, wherein said movable coupling is a flexible material assembly.

2. The in-line valve assembly as recited in claim 1 whereby when said manually operable wrench shaft is rotated in a first direction to a first index mark said valve piston is driven to travel toward said stationary valve piston seat to render said in-line valve assembly in a closed position, and when said manually operable wrench shaft is rotated in a second direction opposite to said first direction to a second index mark said valve piston is driven to travel away from said valve piston seat to render said in-line valve assembly in an open position.

3. The in-line valve assembly as recited in claim 1 wherein said flexible material assembly comprises a flexible belt system.

4. The in-line valve assembly as recited in claim 3 wherein said flexible belt system includes a flexible belt that comprises a flexible frame portion having a frame opening whereby said frame portion is integrally connected to a flexible band segment such that said flexible belt may curve upon itself when installed for use as said movable coupling.

5. The in-line valve assembly as recited in claim 4 wherein said piston rod has a flattened side and said flexible belt has a first end and a second opposing end, whereby said flexible belt is attached to said flattened side of said piston rod at said first end and said second end.

6. The in-line valve assembly as recited in claim 5 wherein said flexible belt has a midpoint whereby said flexible belt is wrapped around and attached to said manually operable wrench shaft at said midpoint.

7. The in-line valve assembly as recited in claim 6 wherein said flexible belt is coated with an elastomer for damping.

8. The assembly for actuating a piston rod as recited in claim 6 wherein said piston rod has a flattened side and said flexible belt has a first end and a second opposing end, whereby said flexible belt is attached to said flattened side of said piston rod at said first end and said second end, and said flexible belt has a midpoint whereby said flexible belt is wrapped around and attached to a bushing which is configured to securely receive said manually operable wrench shaft.

9. The in-line valve assembly as recited in claim 5 wherein said flexible belt has a midpoint whereby said flexible belt is wrapped around and attached to a bushing which is configured to securely receive said manually operable wrench shaft.

10. The in-line valve assembly as recited in claim 4, wherein a portion of said flexible belt which is attached to said wrench shaft is formed to be at a distinct location along an axis of said manually operable wrench shaft relative to a portion of said valve piston which is attached to said piston rod such that said flexible belt may wrap around said manually operable wrench shaft without overlapping said portion of said flexible belt which is attached to said piston rod.

11. The in-line valve assembly as recited in claim 10, wherein said portion of said flexible belt which is attached to said piston rod has upper and lower portions spaced on each side of a portion of said flexible belt which is attached to said manually operable wrench shaft along said axis of said manually operable wrench shaft.

12. in-line valve assembly as recited in claim 3, wherein said flexible belt system is fanned of a textile material.

13. The in-line valve assembly as recited in claim 3, wherein said flexible belt system is formed of a metallic material.

14. The in-line valve assembly as recited in claim 1, wherein said in-line valve is a starter valve for an engine.

15. An assembly for actuating a piston rod comprising:
a piston rod selectively movable by air pressure in a chamber;
a wrench shaft perpendicular to and movably coupled to said piston rod by way of a movable coupling such that a rotation of said wrench shaft translates longitudinal motion to said piston rod wherein said movable coupling comprises a flexible belt system, and when said piston rod is caused to move by the air pressure, said piston rod causing said wrench shaft to rotate through said flexible belt system.

16. The assembly for actuating a piston rod as recited in claim 15, wherein said flexible belt system includes a flexible belt that comprises a flexible frame portion having a frame opening whereby said frame portion is integrally connected to a flexible band segment such that said flexible belt may curve upon itself when installed for use as said movable coupling.

17. The assembly for actuating a piston rod as recited in claim 16, wherein said piston rod has a flattened side and said flexible belt has a first end and a second opposing end, whereby said flexible belt is attached to said flattened side of said piston rod at said first end and said second end, and said flexible belt has a midpoint whereby said flexible belt is wrapped around and attached to said wrench shaft at said midpoint.

18. The in-line valve assembly comprising:
a valve housing;
a valve piston which may be received by a stationary valve piston seat, a piston rod coupled to said valve piston such that said piston rod and said valve piston are movable together relative to said stationary valve piston seat;
a manually operable wrench shaft coupled to said piston rod by way of a movable coupling such that when said manually operable wrench shaft is manually rotated, said piston rod and said valve piston are driven to travel together longitudinally;

when said piston rod and said valve piston are driven together longitudinally as a result of a pressure change imparted to said valve piston said manually operable wrench shaft is driven to rotate, wherein said movable coupling is a flexible material assembly;

said flexible material assembly comprises a flexible belt system, said flexible belt system including a flexible belt that comprises a flexible frame portion having a frame opening whereby said frame portion is integrally connected to a flexible hand segment such that said flexible belt may curve upon itself when installed for use as said movable coupling;

said piston rod has a flattened side and said flexible belt has a first end and a second opposing end, whereby said flexible belt is attached to said flattened side of said piston rod at said first end and said second end;

said flexible belt has a midpoint whereby said flexible belt is wrapped around and attached to said manually operable wrench shaft at said midpoint; and said flattened side of said piston rod is provided with an elastomer backing for damping.

* * * * *

UNITED STATES PATENT AND TRADEMARK OFFICE
CERTIFICATE OF CORRECTION

| | | |
|---|---|---|
| PATENT NO. | : 7,159,614 B2 | Page 1 of 1 |
| APPLICATION NO. | : 10/335590 | |
| DATED | : January 9, 2007 | |
| INVENTOR(S) | : Tiziani et al. | |

It is certified that error appears in the above-identified patent and that said Letters Patent is hereby corrected as shown below:

Claim 12, Column 6, line 61: Insert --The-- before "in-line"

Claim 12, Column 6, line 62: "fanned" should be --formed--

Claims 18, Column 8, line 15: "hand" should be --band--

Signed and Sealed this

Third Day of April, 2007

JON W. DUDAS
*Director of the United States Patent and Trademark Office*

UNITED STATES PATENT AND TRADEMARK OFFICE
CERTIFICATE OF CORRECTION

PATENT NO.         : 7,159,614 B2
APPLICATION NO. : 10/335590
DATED              : January 9, 2007
INVENTOR(S)        : Tiziani et al.

Page 1 of 1

It is certified that error appears in the above-identified patent and that said Letters Patent is hereby corrected as shown below:

On the Title Page:

Inventor names and addresses should read as follows:

(75) Inventors: Peter C. Tiziani, Stafford Springs, CT (US);
Ganesh Anantharaman, East Hartford, CT (US);
Robert G. Pinter, South Bend, IN (US)

Signed and Sealed this

Seventeenth Day of July, 2007

JON W. DUDAS
*Director of the United States Patent and Trademark Office*